United States Patent [19]
Tachibana et al.

[11] Patent Number: 5,511,006
[45] Date of Patent: Apr. 23, 1996

[54] METHOD AND APPARATUS FOR DETERMINING AN AIR QUALITY LEVEL

[75] Inventors: Hirokazu Tachibana, Kyoto; Nobuyuki Yoshiike, Ikoma, both of Japan

[73] Assignee: Matsushita Electric Industrial Co., Ltd., Kadoma, Japan

[21] Appl. No.: 103,124

[22] Filed: Aug. 9, 1993

[30] Foreign Application Priority Data

Oct. 13, 1992 [JP] Japan .................................. 4-274639

[51] Int. Cl.$^6$ .................................................. A62B 11/00
[52] U.S. Cl. ...................... 364/557; 364/556; 364/550; 454/177
[58] Field of Search ...................... 454/229, 176, 454/57, 208, 187; 55/356; 95/14; 73/31.01; 364/571.03, 571.04, 557, 550, 556

[56] References Cited

U.S. PATENT DOCUMENTS

| | | | |
|---|---|---|---|
| 4,690,041 | 10/1990 | Kiser | 454/176 |
| 5,147,429 | 9/1992 | Bartholomew et al. | 55/356 |
| 5,215,498 | 6/1993 | Wong et al. | 454/208 |
| 5,259,812 | 11/1993 | Kleinsek | 454/57 |
| 5,290,200 | 3/1994 | Kiser | 454/229 |

FOREIGN PATENT DOCUMENTS

| | | |
|---|---|---|
| 0405149A2 | 1/1991 | European Pat. Off. . |
| 0518327A3 | 12/1992 | European Pat. Off. . |
| WO89/12269 | 12/1989 | WIPO . |

Primary Examiner—Emanuel T. Voeltz
Assistant Examiner—Thomas Peeso
Attorney, Agent, or Firm—Jones, Tullar & Cooper

[57] ABSTRACT

Method and apparatus for accurately determining an air quality level even when the temperature and humidity are varied can be achieved. A predefining formula used for obtaining the output value of an air quality level sensor according to the conditions of temperature and humidity at a clean state is obtained, the output value at the clean state of the air quality level sensor at a temperature and humidity at air quality detection using the formula is calculated a corrected amount as a difference between the calculated output value and an output value at the clean state of the air quality level sensor at conditions of temperature and humidity providing an absolute determination reference of the air quality level is taken, and the threshold value predetermined at the conditions of temperature and humidity providing an absolute determination reference is connected, by adding the correction amount to the threshold value, and determining an air quality level by comparing an output of the air quality sensor upon the air quality detection, with the corrected threshold value.

10 Claims, 4 Drawing Sheets

METHOD AND APPARATUS FOR DETERMINING AN AIR QUALITY LEVEL

BACKGROUND OF THE INVENTION

1. Field of the Invention

The present invention relates to a method and apparatus for determining an air quality level by detecting an air quality in an accommodation space.

2. Related art of the Invention

Today, as office buildings as well as residences are enclosed at a higher airtight level, efficiency and energy saving in air conditioning have increased. On the other hand, however, carbon dioxide and various odors are accumulated as a result, and problems in human health this causes, while increasing discomfort by reduction of air quality in an accommodation space. As a means for dealing with such circumstances, various air conditioning apparatuses and air quality regulating apparatuses such as ventilators and air cleaners are being introduced.

However, an air quality determination apparatus used in a conventional air quality regulator merely determines air quality by reference to an initially predetermined condition, that is, a set value corresponding to plural temperature stages or humidity stages. Thus, the air quality regulator operated on the basis of such a determination results in providing an operation control only in accordance with the predetermined set value. It thus becomes almost impossible to obtain a control in response to actual changes of air quality in an accommodation space. Specifically, if air quality itself is changed by a variation of temperature and humidity in an accommodation space, discomfort to residents is affected as well. Particularly, in the case where odor is present, an air quality regulator is required which operates in consideration of both temperature and humidity, because it may be felt uncomfortable, when only the humidity is changed, even if it is comfortable in certain conditions of temperature and humidity. However, an effective determination against the influence of such temperature and humidity is a problem and is almost impossible to achieve by conventional air quality determination apparatus.

SUMMARY OF THE INVENTION

Hence, in the light of such problems associated with conventional air quality determination apparatuses, it is an object of the present invention to provide a method and apparatus for determining an air quality level by taking temperature and humidity into consideration.

The method for determining an air quality level of the present invention comprises the steps of:

predefining a formula used in obtaining an output value of an air quality level sensing means according to conditions of temperature and humidity at a clean state, calculating an output value at the clean state of the air quality level sensing means based on a temperature and humidity at the air quality detection using the formula, taking as a correction amount a difference between the calculated output value and an output value at the clean state of the air quality level sensing means at conditions of temperature and humidity which provides an absolute determination reference of air quality level, correcting a threshold value which is pre-determined in the conditions of temperature and humidity which provides an absolute determination reference, by adding the correction amount to the threshold value, and determining an air quality level by comparing an output of the air quality sensing means upon the temperature and humidity at air quality detection, with the corrected threshold value.

In the present invention, an output value at a clean state of air quality level sensing means based on a temperature and humidity at the air quality detection is calculated from a predefined formula, and as a correction amount a difference between the calculated value and an output value at the clean state of the air quality level sensing means at conditions of temperature and humidity which provides an absolute determination reference of air quality level, is calculated, and a threshold value which is determined under temperature and humidity of the absolute determination reference of air quality level is corrected by adding the correction amount to the threshold value, and an output upon air quality detection of the air quality sensing means and the corrected threshold value are compared.

The apparatus for determining an air quality level of the present invention comprises;

air quality sensing means for detecting a state of air quality, temperature and humidity sensing means for detecting temperature and humidity, reference value output means having preliminary relational information established between different temperatures and humidities and output values of the air quality sensing means in a reference air quality, computing means for obtaining a threshold value for air quality determination upon air quality detection by amending a predetermined threshold value of an absolute determination reference value of the air quality level, referring to the relational information, on the basis of the detected temperature and humidity, and the computing means for determining an air quality by comparing an output upon air quality detection of the air quality sensing means with the obtained threshold value for air quality determination upon air quality detection.

In the present invention, the air quality sensing means detects a state of the air quality, and the temperature and humidity sensing means detects temperature and humidity. The reference value output means has preliminary relational information established between different temperatures and humidities and output values of the air quality sensing means in a reference air quality, and the computing means obtains a threshold value for air quality determination upon air quality detection by amending a predetermined threshold value of an absolute determination reference of the air quality level, referring to the relational information, on the basis of the detected temperature and humidity. The computing means for determines an air quality by comparing an output upon air quality detection of the air quality sensing means with the obtained threshold value for air quality determination upon air quality detection.

PREFERRED EMBODIMENTS

An embodiment of the present invention is described below by reference to the drawings.

Figure 1:
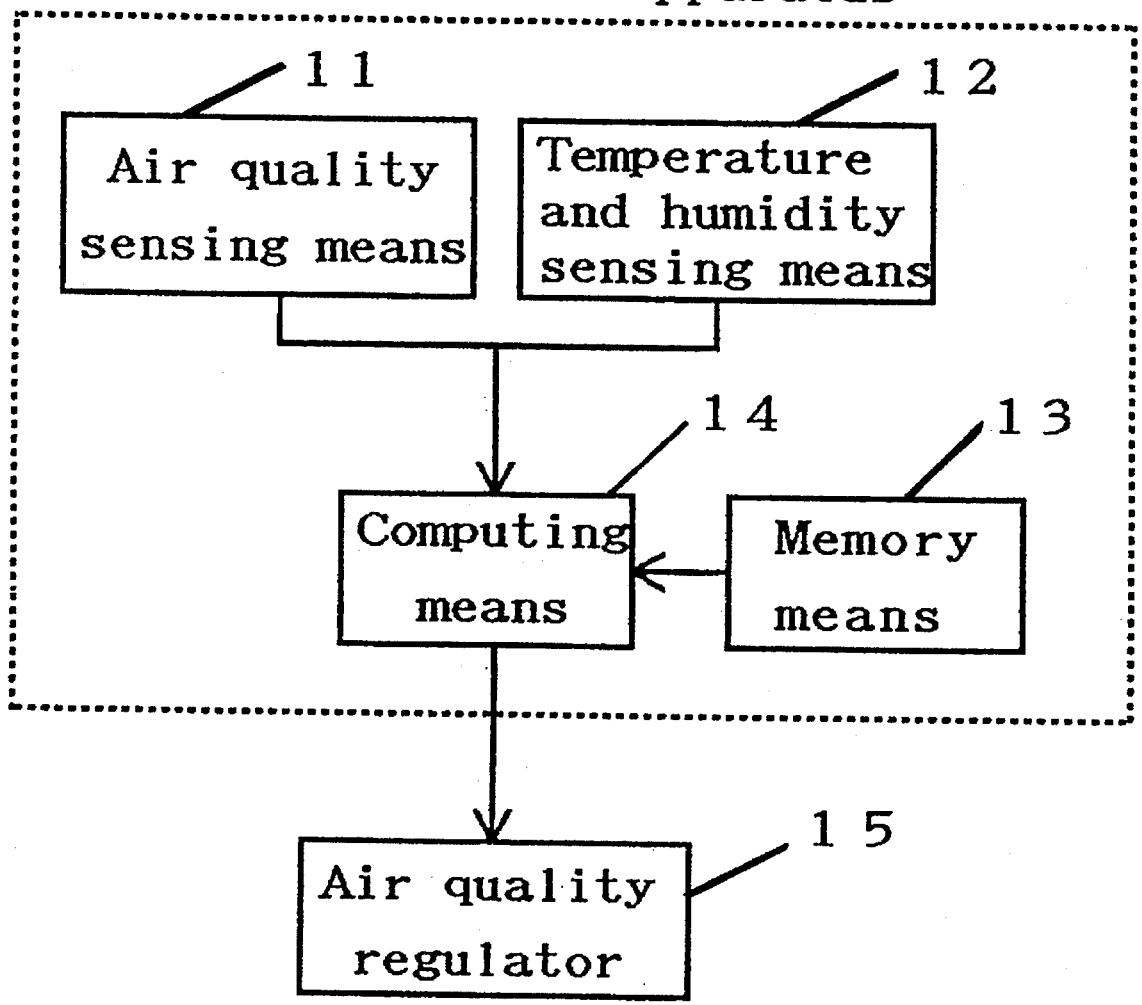
FIG. 1 is a block diagram showing the structure of an air quality level determination apparatus according to an embodiment of the present invention.

FIG. 1 is a block diagram showing an embodiment of an air quality level determination apparatus of the present invention. In FIG. 1, numeral 11 is an air quality sensing means for sensing a state of the air quality, and 12 a temperature and humidity sensing means for sensing temperature and humidity, wherein the state of the air quality, temperature and humidity obtained by both means 11, 12 are provided to computing means 14, and the computing means 14 is adapted to control an air quality regulator 15 on the basis of the state of the air quality, temperature and humidity by referring to memory means 13.

The memory means 13 stores threshold values that provide an absolute determination reference of the air quality level, an output value (first output value) of the air quality sensing means 11 that corresponds to a clean state in conditions of temperature and humidity under which the threshold values are derived, and a temperature and humidity correction formula correlated with output values of the air quality sensing means 11, respectively. The memory means 13 can be considered as a reference value output means, and the temperature and humidity correction formula established between various kinds of temperatures and humidities prestored in the memory means 13 and output values of the air quality sensing means 11 in an air quality that provides the determination reference, for example air the quality in a clean state, is considered as relational information.

The computing means 14, referring to the memory means 13, calculates from the temperature and humidity correction formula an output of the air quality sensing means corresponding to a clean state at a temperature and humidity upon air quality detection. And the computing means 14 calculates and takes as an output correction amount a difference between the calculated value (second output value) and the output value (first output value) of the air quality sensing means 11 corresponding to a clean state at a temperature and humidity providing an absolute determination reference of the air quality level, the first output value being prestored in the memory means 13. And then the computing means 14 adds the output correction amount calculated to an output value of the threshold value for an air quality determination at the temperature and humidity providing the absolute determination reference of the air quality level, the output value of the threshold value being prestored in the memory means 13, thereby the output value of the threshold value is corrected. Further the computing means 14 determines an air quality level by comparing the output of the air quality sensing means 11 at an air quality detection with the corrected output value of the threshold value for air quality determination, and outputs the result as a control signal for controlling the air quality regulator 15.

In the noted embodiment, as the air quality sensing means 11, an $SnO_2$ semiconducting gas sensor (hereinafter called as a gas sensor) capable of sensing such organic solvents as alcohols, volatile sulfides and nitrogen-containing compounds is used. In addition, a ceramic thermistor (hereinafter thermistor) is used as a temperature sensor and a ceramic humidity sensor (hereinafter humidity sensor) as a humidity sensor of the temperature and humidity sensing means 12.

Figure 2:
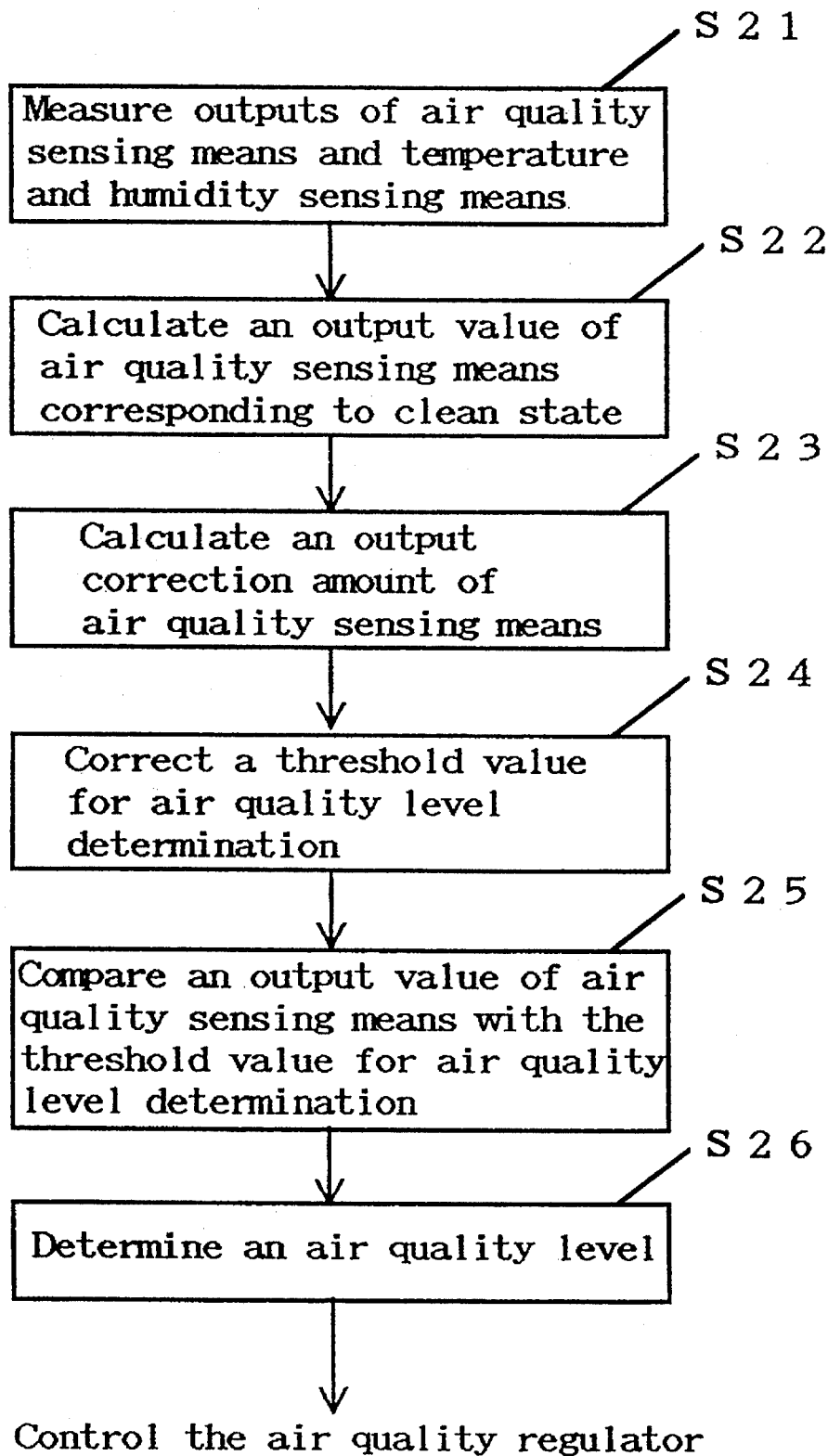
FIG. 2 is a flowchart representing a procedure for determining an air quality level in accordance with an embodiment of the present invention.

The, operation of the embodiment is described below. FIG. 2 is a flowchart showing a procedure for determining an air quality. When the air quality level determination apparatus is activated, an output of the temperature and humidity sensing means 12 and an output of the air quality sensing means 11 are measured (step 21), and an output value of the air quality sensing means 11 that corresponds to a clean state at the temperature and humidity of the air quality detached is calculated by the temperature and humidity correction formula (step 22). Succeedingly, a difference between the calculated value and an output value of the air quality sensing means 11, prestored in the memory means 13, corresponding to a clean state at the temperature and humidity providing an absolute determination reference of the air quality level is calculated, and is regarded as an output correction amount (step 23). Then, by adding the output correction amount to an output value of the threshold value for the air quality level determination at the temperature and humidity that provide the absolute determination reference of the air quality level, the output value of the threshold value for the air quality level determination is corrected (step 24). In succession, by comparing an output of the air quality sensing means 11 and the corrected output value of the threshold value for the air quality level determination (step 25), an air quality level is determined (step 26), and a control signal for controlling the air quality regulator 15 is outputted on the basis of the result.

In order to confirm the operation of such as air quality level determination apparatus, an air quality was measured in a laboratory room of approximately 1.5×2×2.2 m in size that is provided with an air conditioner having ventilating and air cleaning functions (hereinafter air quality regulator). The gas sensor, thermistor and humidity sensor were attached in a mutual vicinity on a wall of the room at a level of approximately 1.2 m.

Figure 3:
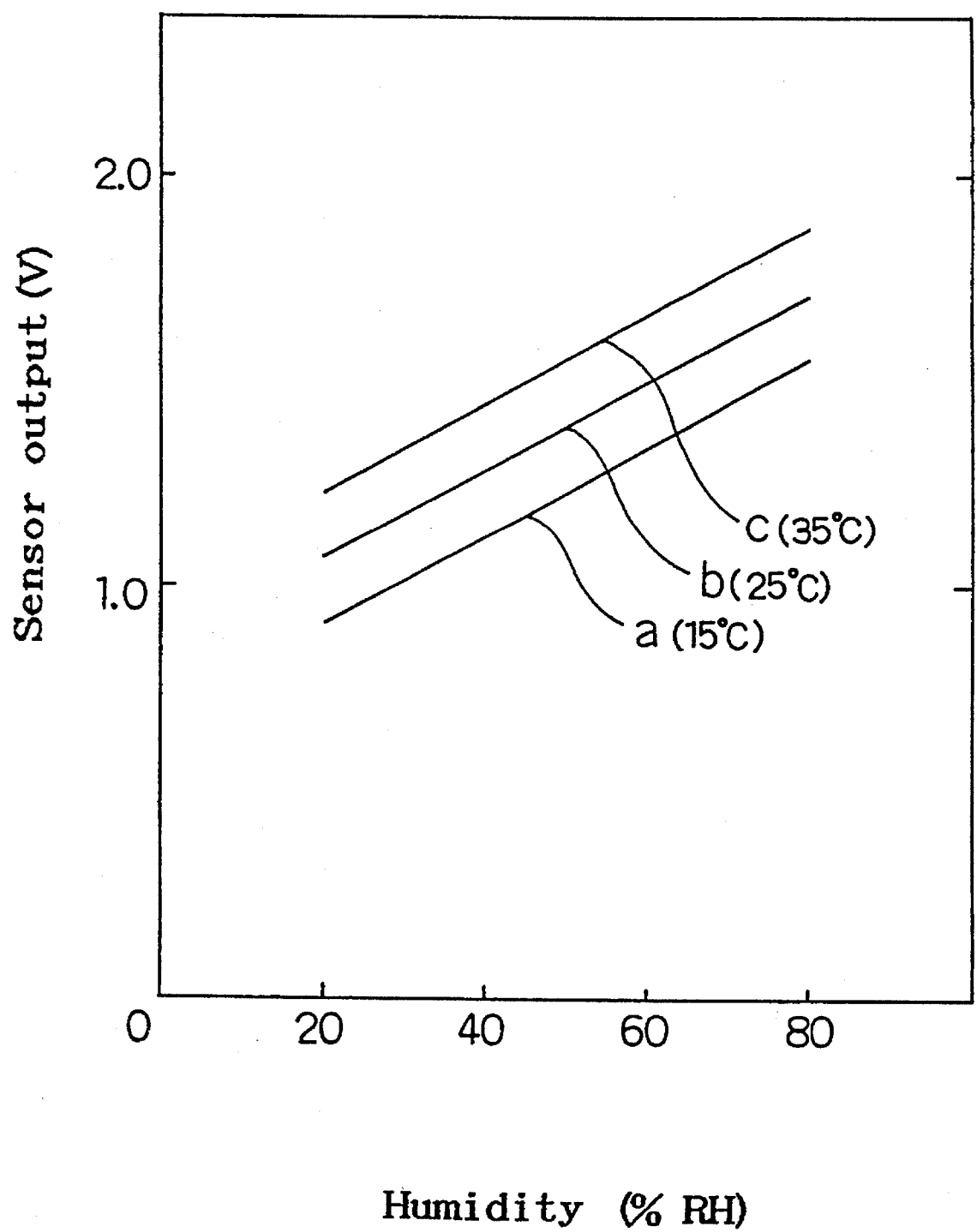
FIG. 3 is a characteristic diagram showing a temperature-humidity characteristic of voltage outputs of a gas sensor used in the embodiment.

FIG. 3 illustrates the temperature and humidity characteristics of a voltage output (used as a sensor output in the embodiment, and hereinafter referred to as a sensor output) of the gas sensor used in the embodiment, and a relation between humidities and sensor outputs is shown in a graph with temperature as a parameter. In FIG. 3, temperature and humidity characteristics at 15° C. (line a), 25° C. (line b) and 35° C. (line c) are shown, respectively, as examples. As can be seen from FIG. 3, with the gas sensor, the humidity and sensor output (V) are in a proportional relationship in a humidity range of 20 to 80% RH, and can be expressed by a general formula (Formula 1).

Formula 1

$$V = A \times [\% \ RH] + B$$

In the case of the gas sensor, since the characteristic lines are parallel with each other, a constant A: $1.7 \times 10^{-2}$ (v/% RH) represents an inclination, and parameter B is 0.07 v (15° C.), 0.86 v (25° C.) and 1.02 v (35° C.), respectively.

Figure 4:
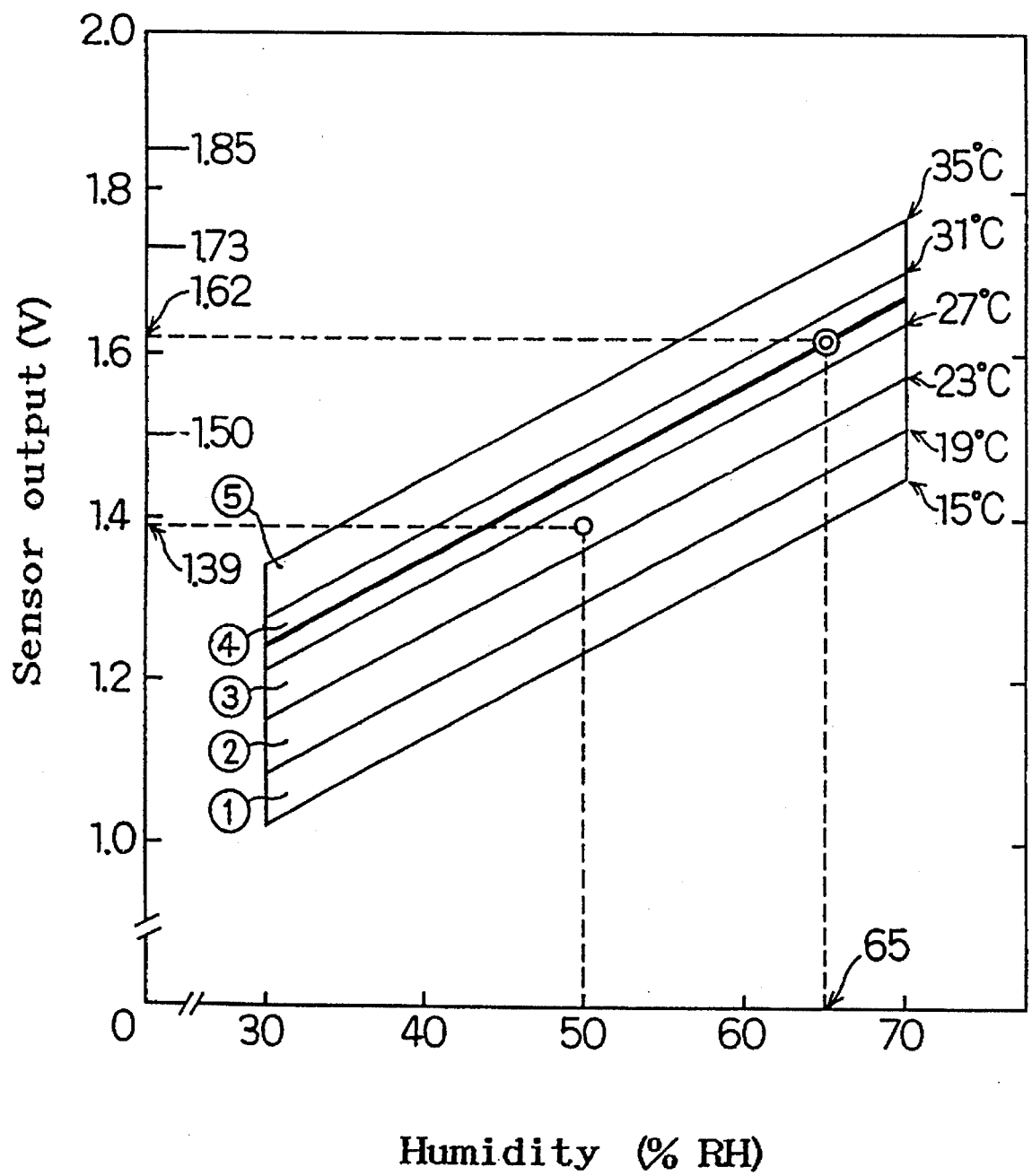
FIG. 4 is an explanatory drawing for explaining output correction in determining an air quality level according to the embodiment.

In FIG. 4, correction of the sensor output in the air quality level determination is explained. In the case of the embodiment, as shown in the figure, a portion within a range of temperatures between 15° and 35° C. and humidities between 30 and 70% RH that is enclosed by straight lines is regarded as a temperature and humidity correction range. Furthermore, the temperature and humidity correction range is divided into five sections referred to as sections 1, 2, 3, 4 and 5 delimiting the ranges 1, 2, 3, 4 and 5 at temperatures of 19°, 23°, 27° and 31° C. The delimiting temperatures 15°, 19°, 23°, 27° and 31° C. are regarded as belonging to the sections ①, ②, ③, and ④, respectively, and temperature 35° C. to the section ⑤.

In the embodiment, a temperature and humidity that provide an absolute determination reference of the air quality level are set at 25° C. and 50% RH, respectively (shown by an ○ in FIG. 4). Therefore, at this temperature and humidity, a sensor output value corresponding to a clean state is 1.39 v, and an output value of the threshold value for the air quality level determination is 1.5 v. The output value of the threshold value for the air quality level determination of 1.5 v is an experimental value obtained from a correlation between a sensor output of the air quality sensing means 11 with an air quality load (odor) at 25° C. and 50% RH and a discomfort impression (report) of a subject man. On the other hand, the temperature and humidity at an air quality detection in an experiment for confirming operation of the air quality level determination apparatus were set at 30° C. and 65% RH, respectively.

Thus, in the laboratory room, as a result of setting the temperature and humidity at 30° C. and 65% RH, respectively, and measuring a sensor output by applying some air quality load (odor), the sensor output of the air quality sensing means 11 was 1.85 v.

As shown in FIG. 4, the temperature and humidity conditions of 30° C. and 65% RH belong to the section ④. And a temperature and humidity correction formula associated to sensor outputs in the section ④ can be defined as shown in a formula 2 by setting A=1.07×10⁻² (v/% RH), B=0.92 v (which corresponding to a straight line shown by a bold line in the figure).

Formula 2

$$V = 1.07 \times 10^{-2} \times [\% RH] + 0.92$$

Meanwhile the temperature and humidity correction formula 2 is established at an intermediate value (mean value) of temperatures in the divided temperature sections. Therefore, it represents a sensor output at a temperature of 29° C., and is regarded as a temperature and humidity correction formula for calculating a correction amount of the sensor output in section 4. A sensor output corresponding to a clean state at 30° C., 65% RH (shown by a ⊙ in the FIG. 4) is calculated to be 1.62 v from the formula 2. As a result, a correction amount of the sensor output is calculated as 1.62−1.39=0.23 v, and an output of the threshold value for air quality level determination is corrected to 1.50+0.23=1.73 v, accordingly.

Succeedingly, the sensor output of 1.85 v at air quality detection was compared with the output of the threshold value for air quality level determination of 1.73 v, and it was determined, as a result, that the air quality level is significantly degraded, because 1.85 v>1.73 v. On the other hand as a result of experiment at this time, a discomfort report showed a significant discomfort, and the report was consistent with a determination result based on a sensor output of the air quality level determination apparatus.

As described above, by using a method of determining an air quality level and air quality level determination apparatus utilizing the method according to the present invention, a sensor output can be easily corrected on the basis of temperature and humidity changes, and the air quality level can be accurately determined. Although conditions of the section ④ are described as an example in the embodiment, correction of a sensor output and determination of an air quality level can be easily performed in the same manner in other sections as well by changing the value of parameter B in the temperature and humidity correction formula, respectively. The parameter B in sections ①, ②, ③ and ⑤ of the embodiment is in the order 0.73 v, 0.79 v, 0.86 v and 0.99 v, respectively.

In the embodiment of the present invention, where the temperature and humidity correction range is divided into 5 sections in terms of temperature is described, by further increasing the number of divisions, a threshold value for air quality level determination can be corrected more in detail, and precision of air quality level determination can be increased thereby.

Additionally, although the temperature and humidity correction range is divided into plural sections in terms of temperature, as described in the above embodiment of the present invention, a similar result to that of the embodiment can be obtained by using such a method of dividing the temperature and humidity correction range into plural sections in terms of humidity, and defining a temperature and humidity correction formula by which an output of the air quality sensing means 11 is expressed by a linear expression of temperature.

Moreover, in the embodiment of the present invention where lines representing the temperature and humidity correction formula are parallel to each other the value of A in the temperature and humidity correction formula may differ, depending on the gas sensor, and the inclination of the lines in the lower and higher temperature ranges In such a case, by setting A and B independently in each section, respectively, a similar correction to that of the embodiment can be achieved.

The present invention can utilize a table equivalent to the above-mentioned formula.

In addition, in the embodiment, although an $SnO_2$ semiconductive gas sensor is utilized as an air quality sensing means of the present invention, an equivalent of various gas sensors may be alternatively be used. Moreover, plural gas sensors having different gas selectivity may be used, in such a case, a factor that causes degradation of air quality can be identified, and air quality can be adjusted more finely at the same time. Also, it is not limited to a semiconductive gas sensor, and such an air quality sensing means, as an optical gas sensing means and chemical chemical gas sensing means can be used according to the particular purpose and size.

Furthermore, the temperature and humidity sensing means of the present invention is not limited to such ceramic sensor and ceramic humidity sensor of the embodiment, and arbitrary means may be employed as far as it is capable of sensing temperature and humidity and outputting a signal.

As appreciated by the above description, according to a method for determining an air quality level of the present invention, a threshold value that provides an absolute determination reference of the air quality level is corrected in response to a temperature and humidity of the air quality detected, and an air quality level is determined, so that the air quality is accurately determined.

Additionally, according to an apparatus for determining an air quality level of the present invention, even when temperature and humidity are varied, a level of air quality can be easily and accurately determined, and the air quality can be maintained and controlled at a comfortable level by applying the determination result to an air quality regulator, and properly controlling the air quality regulator.

What is claimed is:

1. A method for determining an air quality level, comprising the steps of:

predetermining and storing a range of reference values of an air quality level utilizing conditions of air temperature and humidity;

sensing air temperature and humidity at a time subsequent to obtaining the predetermined and stored reference values and generating an output value of the sensed air temperature and humidity;

obtaining a threshold value of an air quality level from said reference values and said output value corresponding to a clean air state; and comparing said threshold value and said output value to define a control value, wherein:

said predetermined and stored reference values are defined by various related temperatures and humidities and various temperature and humidity outputs at a clean state of the air quality; and said threshold value is corrected by a preselected output correction amount from said reference values.

2. A method for determining an air quality level according to claim 1, wherein said reference values are expressed by a linear expression of humidity in each of the plural ranges of said range of reference values from which a correction range of temperature and humidity is derived by temperature conditions.

3. A method for determining an air quality level according to claim 1, wherein said reference values are expressed by a linear expression of temperature in each of the plural ranges of said range of reference values from which a correction range of temperature and humidity is derived by humidity conditions.

4. An apparatus for determining an air quality level comprising;

air quality sensing means for detecting a state of air quality;

temperature and humidity sensing means for detecting air temperature and humidity;

reference value output means having preliminary relational values established between different temperatures and humidities and output values of the air quality sensing means, said relational values serving as a reference air quality; and computing means connected to said air quality sensing means, said temperature and humidity sensing means and said reference value output means, for obtaining a threshold value for air quality determination upon air quality detection by amending a predetermined threshold value of an absolute determination reference of air quality level from said preliminary relational values on the basis of the detected temperature and humidity, said computing means determining air quality by comparing an output upon air quality detection of the air quality sensing means with the obtained threshold value for air quality determination upon air quality detection.

5. An apparatus for determining an air quality level according to claim 4, wherein the reference air quality is a clean air quality, and said computing means receiving an output from said air quality sensing means as a clear air quality at a temperature and humidity during air quality detection by using said relational values of the clean air quality, obtaining a difference between the received output and an output of said air quality sensing means at a temperature and humidity as an absolute determination reference of the air quality level, and adding the difference to said predetermined threshold value of the absolute determination reference of the air quality level.

6. An apparatus for determining an air quality level according to claim 4, wherein, the air quality sensing means includes a gas sensor.

7. An apparatus for determining an air quality level according to claim 4, wherein the temperature and humidity sensing means includes a ceramic thermistor and a ceramic humidity sensor.

8. An apparatus for determining an air quality level comprising;

air quality sensing means for detecting a state of air quality;

temperature and humidity sensing means for detecting air temperature and humidity;

memory means for storing threshold values that provide an absolute determination reference of air quality level, a first output value indicative of a clean state of the air quality sensing means as a condition of temperature and humidity under which the threshold values are derived and a formula for an output value of the air quality sensing means that is correlated with various values of temperature and humidity;

correction means for computing a second output value t indicative of a clean state of the air quality sensing means on the basis of temperature and humidity detected by the temperature and humidity sensing means during air quality detection by using said formula, calculating and taking as an output correction amount a difference between the second output value and the first output value, and correcting a threshold value for air quality level determination by adding the correction amount to the threshold value for air quality level determination; and computing means for determining an air quality level by comparing the corrected threshold value for air quality level determination by the correction means with an output of said air quality sensing means, and outputting a control signal for controlling an air quality regulator.

9. An apparatus for determining an air quality level according to claim 8, wherein 10. An apparatus for determining an air quality level according to claim 8, wherein the temperature and humidity sensing means includes a ceramic thermistor and a ceramic humidity sensor.

* * * * *

UNITED STATES PATENT AND TRADEMARK OFFICE
CERTIFICATE OF CORRECTION

PATENT NO. : 5,511,006
DATED : April 23, 1996
INVENTOR(S) : Hirokazu Tachibana et al It is certified that error appears in the above-indentified patent and that said Letters Patent is hereby corrected as shown below:

COLUMN 8,
Claim 8, line 15, delete "t".

Claim 9, line 2, after "wherein" insert --the air quality sensing means includes a gas sensor.--.

Signed and Sealed this

Tenth Day of September, 1996

Attest:

BRUCE LEHMAN

*Attesting Officer*    Commissioner of Patents and Trademarks